US011797697B1

(12) United States Patent
Holmes et al.

(10) Patent No.: US 11,797,697 B1
(45) Date of Patent: Oct. 24, 2023

(54) SHARING WITH MULTIPLE PEOPLE ACCESS TO ONE OR MORE RESOURCES EACH CONVEYED IN A SINGLE NFT

(71) Applicant: NFT Worlds, LLC, Redmond, WA (US)

(72) Inventors: Max Holmes, Redmond, WA (US); Braydon Batungbacal, University Place, WA (US)

(73) Assignee: NFT WORLDS, LLC, Redmond, WA (US)

( * ) Notice: Subject to any disclaimer, the term of this patent is extended or adjusted under 35 U.S.C. 154(b) by 0 days.

(21) Appl. No.: 18/062,463

(22) Filed: Dec. 6, 2022

Related U.S. Application Data

(63) Continuation of application No. 17/954,121, filed on Sep. 27, 2022.

(51) Int. Cl.
*H04L 9/32* (2006.01)
*G06F 21/62* (2013.01)

(52) U.S. Cl.
CPC ............... *G06F 21/6209* (2013.01)

(58) Field of Classification Search
CPC .................................................. G06F 21/6209
See application file for complete search history.

(56) References Cited

U.S. PATENT DOCUMENTS

| 11,348,152 B1* | 5/2022 | Davis ................. G06Q 30/0601 |
| 11,367,060 B1* | 6/2022 | Barbashin ............ G06Q 20/389 |
| 2020/0005284 A1* | 1/2020 | Vijayan .................... H04L 63/08 |
| 2022/0122050 A1* | 4/2022 | Pacella .................... G06Q 40/04 |
| 2023/0009908 A1* | 1/2023 | Castinado ............. H04L 9/0819 |
| 2023/0138023 A1* | 5/2023 | Yang ....................... A63F 13/86 463/42 |
| 2023/0252018 A1* | 8/2023 | Sharma .................. G06F 16/27 707/703 |

\* cited by examiner

*Primary Examiner* — Vance M Little
(74) *Attorney, Agent, or Firm* — SEED IP LAW GROUP (57) ABSTRACT

A facility for proxying NFT is described. The facility intercepts a request directed to a user to prove possession of a particular NFT. In response to this intercepting, the facility determined that the NFT is a shared NFT, and that the user is among a group of users entitled to use the shared NFT. In response to this determining, the facility automatically uses information available by virtue of possession of the shared NFT to satisfy the intercepted request on behalf of the distinguished user.

24 Claims, 12 Drawing Sheets

| | Proposal date 1011 | Transfer in or out 1012 | Token 1013 | Sponsor 1014 | Status 1015 | Yes votes 1016 | No votes 1017 |
|---|---|---|---|---|---|---|---|
| 1001 | 9-10-2024 | transfer in | KanjiClub | Action43 | active | 365 | 209 |
| 1002 | 9-01-2024 | transfer in | dblStacks | Marksman | closed | — | — |
| 1003 | 9-18-2024 | transfer out | unltd_bars | TheOrchid | active | 92 | 13 |
| ... | | | | | | | |

Proposal Table 1000

SHARING WITH MULTIPLE PEOPLE ACCESS TO ONE OR MORE RESOURCES EACH CONVEYED IN A SINGLE NFT

CROSS-REFERENCE TO RELATED APPLICATION

This application is a Continuation application of U.S. patent application Ser. No. 17/954,121, filed Sep. 27, 2022 and entitled "SHARING WITH MULTIPLE PEOPLE ACCESS TO ONE OR MORE RESOURCES EACH CONVEYED IN A SINGLE NFT", which is hereby incorporated herein by reference.

BACKGROUND

Non-fungible tokens ("NFTs," or "tokens") are unique digital assets whose ownership is tracked using a blockchain. At any time, the present owner of a particular NFT can be determined by examining the NFT's blockchain ledger.

While every NFT—and its ownership—is distinguishable from every other NFT by virtue of having different identifiers, a group of NFTs are sometimes issued in a collection. Some art NFT collections, for example, each link to a slight variant on a single artistic theme. For some NFT collections, ownership connotes membership in a club, or access to some resource. For example, an NFT collection may connote membership in an exclusive virtual reality croquet club, and may provide to holders of an NFT in the collection the ability to play VR croquet against celebrities.

DETAILED DESCRIPTION

The inventors have recognized that it can be advantageous for the owner of an NFT that is in a collection that provides access to a resource to be able to share that access with others. Accordingly, the inventors have conceived and reduced to practice a software and/or hardware facility for sharing with multiple people access to one or more resources each conveyed in a single NFT ("the facility"). In particular, the facility shares access to resources conveyed by a set of "pool NFTs" obtained by the operator of the facility. For example, these pool NFTs may include a first NFT providing access to celebrity VR croquet games; a second NFT providing access to a poetry authoring tool; and a third NFT providing access to an exclusive forum for discussing Avant-Garde musical artists. The facility identifies a group of people ("the community") who it permits to access these resources based on the ownership of the corresponding pool NFTs by an entity associated with the facility.

In some embodiments, a collection of "community NFTs" is issued to control membership in the community. In order to become a member of the community, a person (1) obtains one of the community NFTs; (2) installs a web-based wallet manager that has been adapted for use with the facility; and (3) places the community NFT in a wallet that the person controls that is accessible using the facility wallet manager. In some cases, pool NFTs are referred to herein as "shared NFTs" or "shared tokens," while community NFTs are referred to as "sharing NFTs" or "sharing tokens."

In some embodiments, when a new pool NFT is obtained, the facility (1) adds it to a list of the pool NFTs; (2) places it in a pool wallet; and (3) sends the pool wallet's private key to a key signing service for secure storage.

In some embodiments, in order to access one of the resources, a community member navigates to a web page for the resource that controls access to the resource. This web page presents a request to demonstrate the right to access the resource, in which it provides a "nonce" text string, and seeks a signature on this nonce made with a private key for a wallet containing an NFT corresponding to the resource. The facility wallet manager intercepts this request. In response, the facility determines whether the NFT whose wallet's signature is sought is on the list of pool NFTs, and whether the wallet presently contains a community NFT. If both conditions are satisfied, the facility forwards the nonce to the key signing service with credentials demonstrating that it owns the community wallet, with a request to return a signature on the nonce made with the community wallet's private key. When this signature is returned, the facility wallet manager populates the signature into the form field presented by the web site to receive it. In response to receiving the signature, the web site permits access to the resource after checking to be sure that the pool NFT is held in the signing wallet.

In some embodiments, the facility uses techniques to increase the likelihood that the community members continue to have access to the resources. In some embodiments, the facility periodically rotates some or all of the pool NFTs among a number of pool wallets. In some embodiments, where community members report authentication problems for a particular pool NFT that are not resolved by wallet rotation, the facility exchanges that pool NFT for another NFT providing access to the same resource, such as by initiating transfer out of the existing pool NFT and transfer in of a replacement NFT.

In some embodiments, the facility provides a mechanism for community members to propose and vote on modifications to the pool by transfer in or transfer out of pool NFTs.

By operating in some or all of the ways described above, the facility enables a group of people to share the benefits of owning one or more NFTs, such as by accessing resources to which these NFTs provide access.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by storing the pool NFTs centrally on behalf of the community members, the facility reduces the total storage volume that would be needed for each of the community members to store their own instance of each of the pool NFTs. Also, because each community member's wallet can contain a single community NFT in place of the multiple pool NFTs, the total number of NFTs contained by this wallet is reduced. This in turn reduces the number of user interface interactions the community member's computer must process as part of browsing or otherwise navigating the NFTs contained by the community member's wallet.

Figure 1:
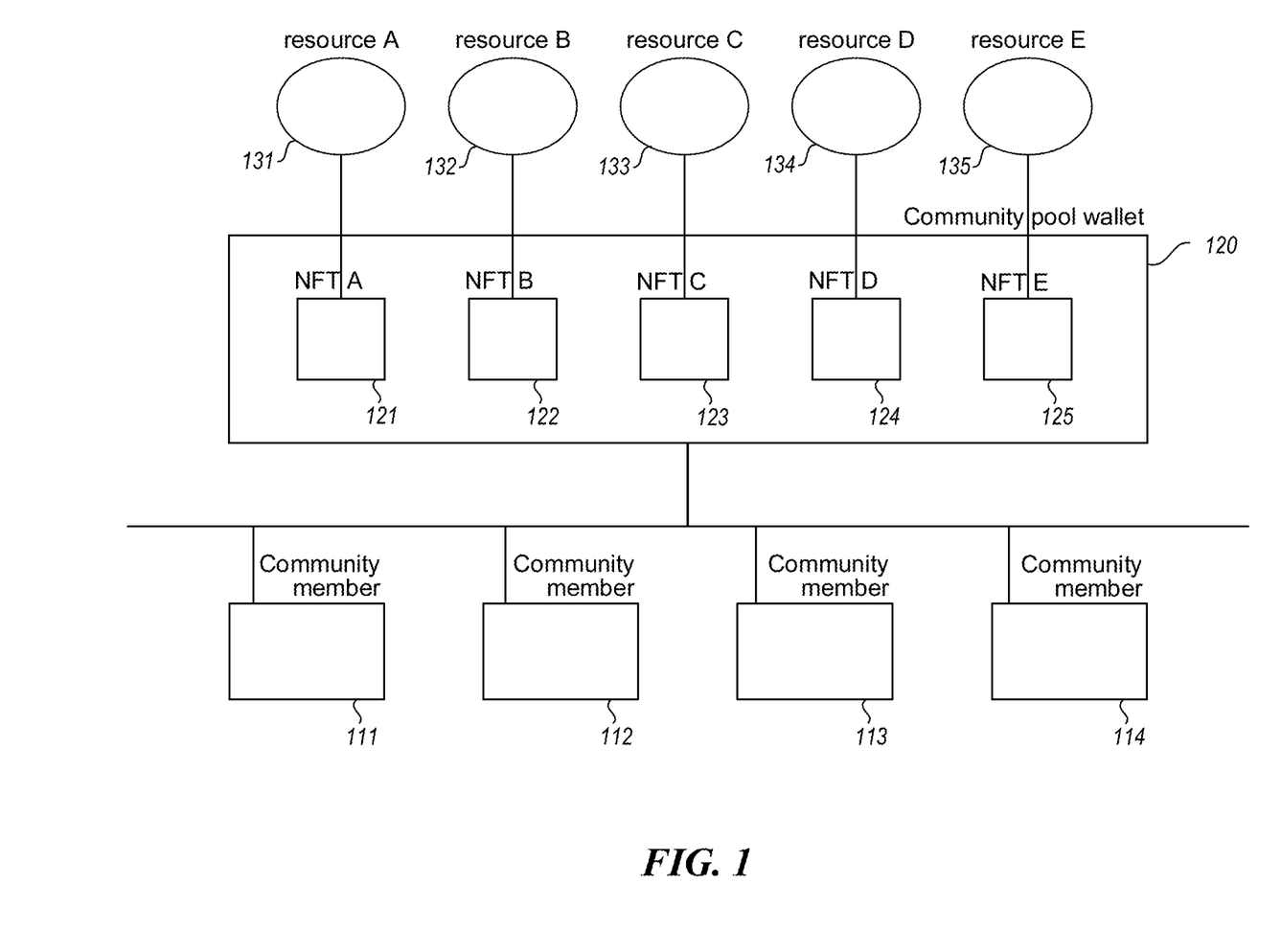
FIG. 1 is an architectural diagram depicting the sharing of pool NFTs by community members.

FIG. 1 is an architectural diagram depicting the sharing of pool NFTs by community members. The drawing shows community members 111-114, each of which can make use of any of pool NFTs 121-125 held in a community pool wallet ("community wallet") 120 to access corresponding resources 131-135.

Figure 2:
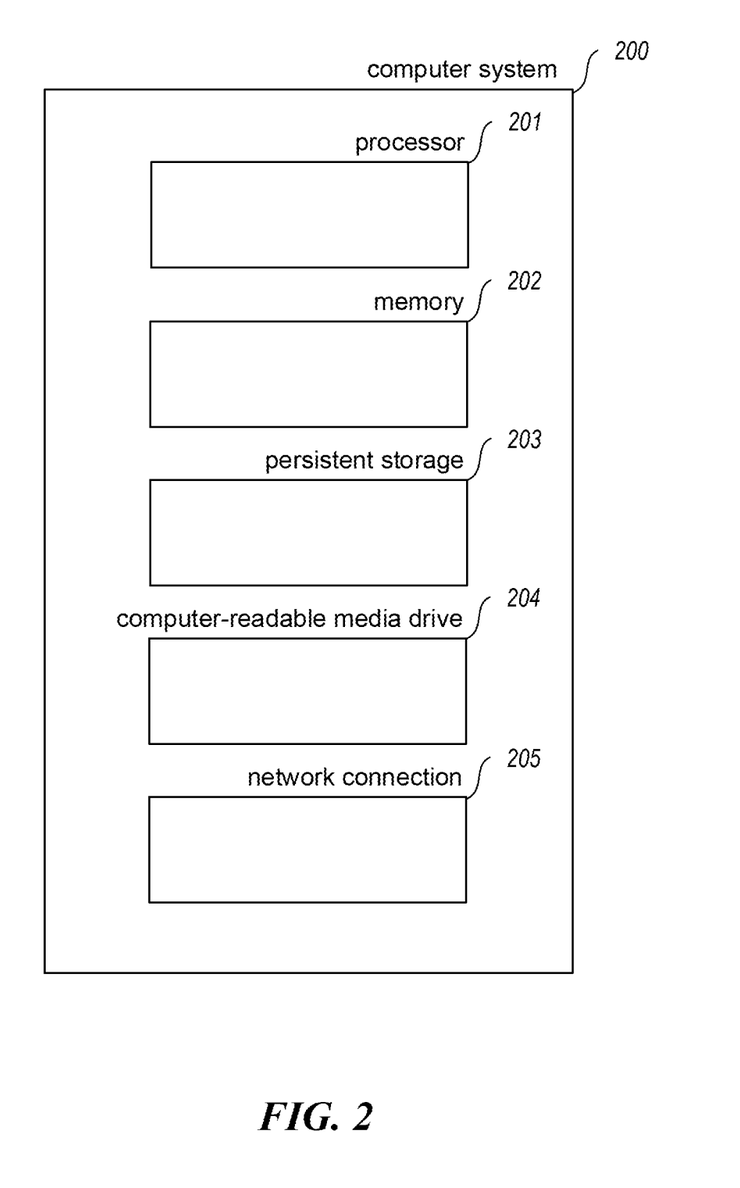
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
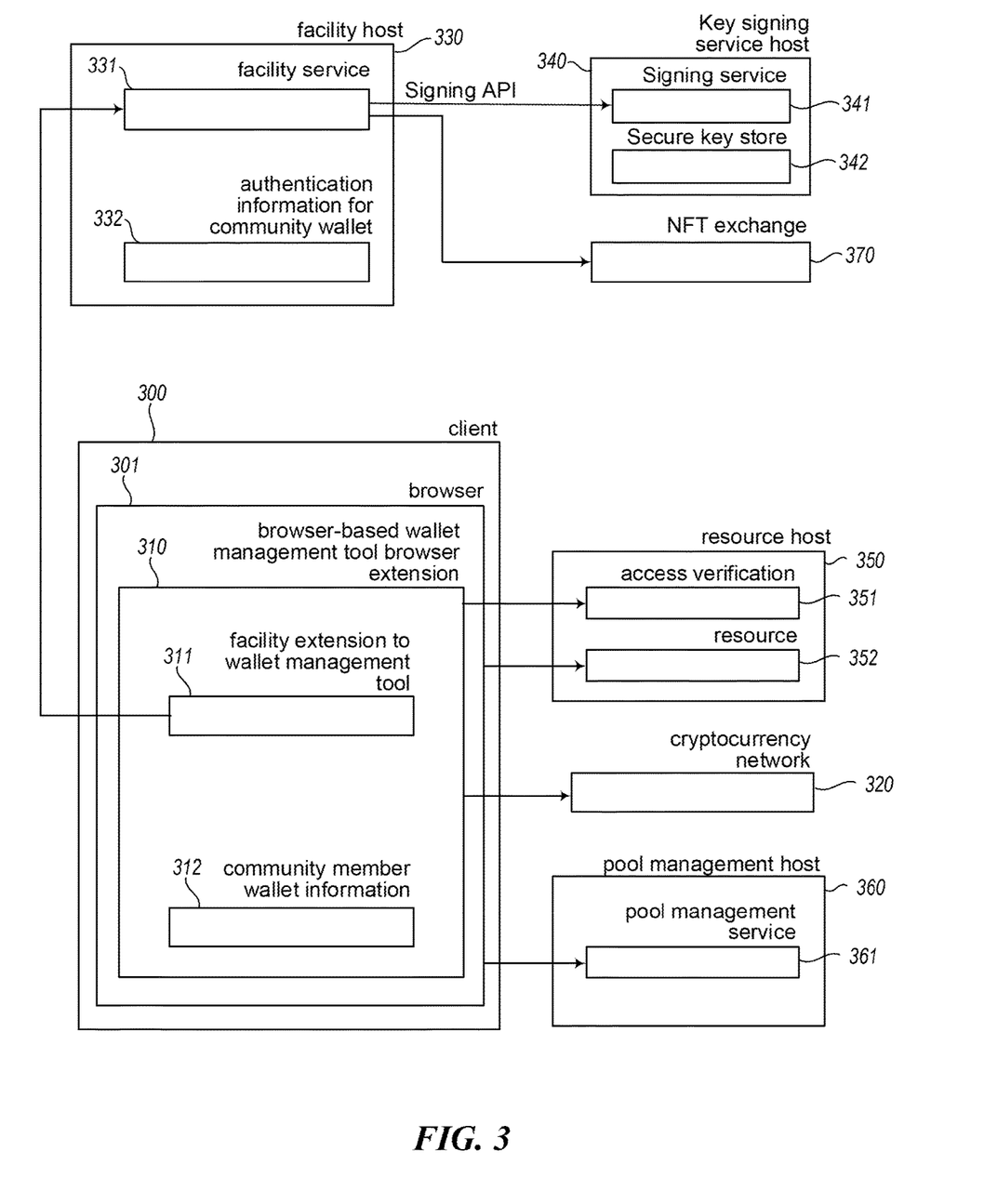
FIG. 3 is an invocation diagram showing the relationship between different code modules used in connection with the facility in some embodiments.

FIG. 3 is an invocation diagram showing the relationship between different code modules used in connection with the facility in some embodiments. Additional details about their interactions are discussed below in connection with FIGS. 4-13.

In some embodiments, to become a community member, a person obtains a community NFT. On a browser 301 running on a client computing device 300, the person installs a browser-based wallet management tool browser extension 310 for managing wallets within the browser. The browser extension includes an extension 311 to the management tool that extends the wallet management tool to operate with the facility. The browser extension also contains community member wallet information 312, such as a pointer or identifier for the wallet, a cache of items held in the wallet, etc. In some embodiments, the person places the community NFT they've obtained in a personal wallet managed by the wallet management tool browser extension.

In order to make use of their community membership, the person navigates in the browser to a webpage in which the issuer of a pool NFT provides access to a resource gated by the pool NFT. The person continues to navigate in the browser to a point on this webpage that performs access verification 351 by providing a message, or "nonce" that is to be signed using the private key for a wallet containing an NFT among the group of NFTs to whose holders access to the resource is to be provided. This signing request is intercepted by the facility extension in the wallet management tool. Subsequently, the facility, such as in the facility's extension wallet management tool or a facility service 331 executing on a facility host 330, makes two determinations: (1) whether the NFT with which the nonce is to be signed is among the pool NFTs, and (2) whether a wallet being managed by the wallet management tool contains a community token. If both of these conditions are true, the facility extension to the wallet management tool calls the facility service with a copy of the nonce to request its signing with the private key of the community wallet containing the corresponding pool NFT. The facility service in turn calls a signing API of a signing service 341 executing on a key signing service host 340, passing the nonce, identifying information for the community wallet with which the nonce is to be signed, and authentication information 332 for the community wallet that demonstrates to the key signing service host that the caller has the authority to make this request. After verifying the authentication information, the signing service accesses the private key for the community wallet from a secure key store 342 that it maintains, and uses it to sign the nonce, producing a signature. The signing service returns the signature to the facility service, which returns it to the facility extension. The facility extension populates the signature into a field provided by the resource host's access verification component. In response to verifying that the signature is proper for a wallet containing the pool NFT, the resource host provides access to the resource 352 through the browser. At various points, the wallet management tool (including the facility extension) accesses a cryptocurrency network 320 hosting ownership information for various NFTs, as does the facility service (not shown). In some embodiments, the person uses the browser to access a pool management service 361 executing on a pool management host 360, for the purpose of participating in group decision-making about pool NFTs that should be transferred in or transferred out.

Figure 4:
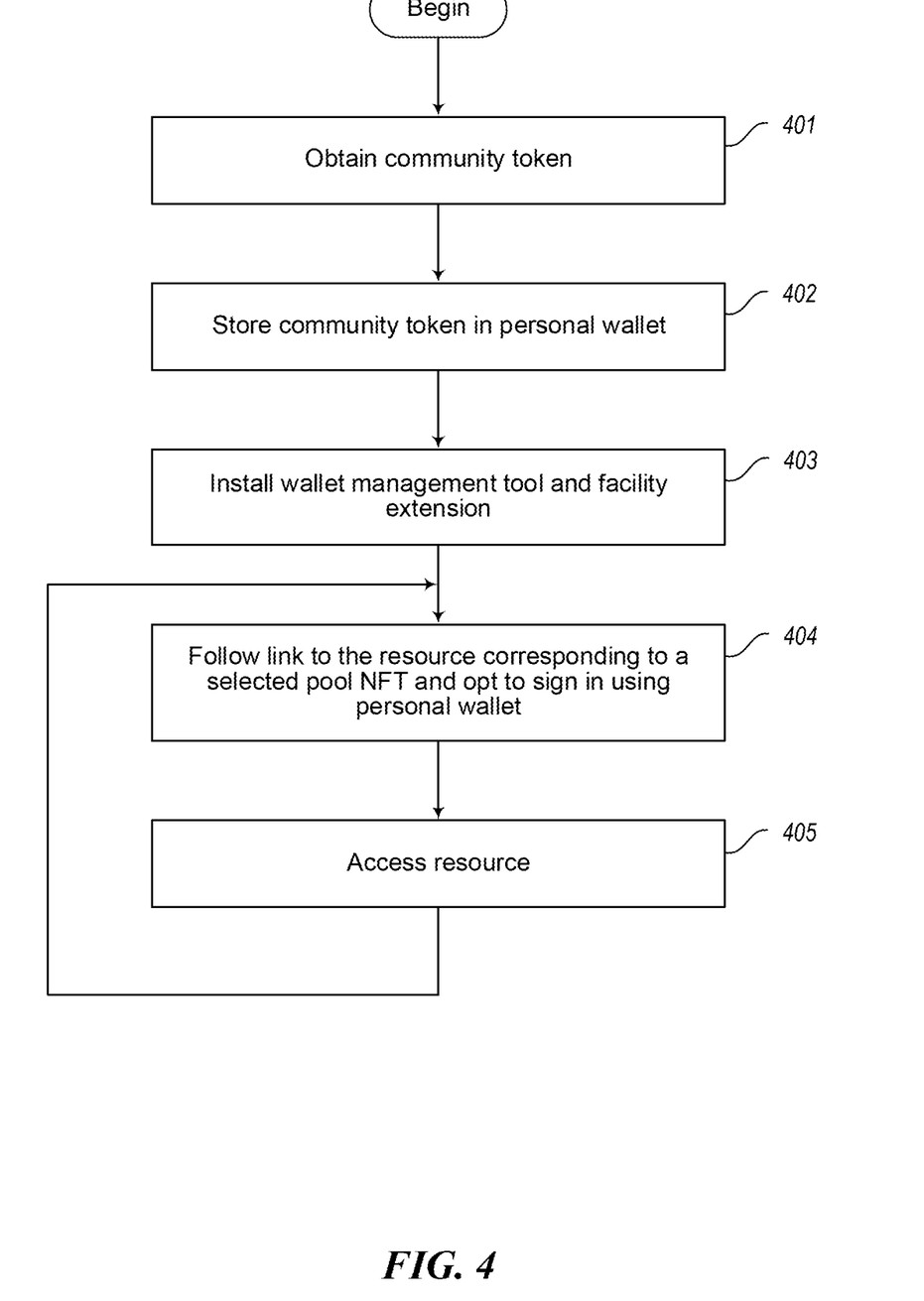
FIG. 4 is a flow diagram showing a process performed by the facility in some embodiments to become a community member and take advantage of that membership to access a resource to which access is limited to those who can demonstrate ownership of a pool NFT in the community's pool.

FIG. 4 is a flow diagram showing a process performed by the facility in some embodiments to become a community member and take advantage of that membership to access a resource to which access is limited to those who can demonstrate ownership of a pool NFT in the community's pool. In act 401, the facility obtains a community token on a behalf of the person, such as using an online NFT exchange where community NFTs are listed or otherwise available; obtaining a community NFT from the issuer of community NFTs, etc. In act 402, the facility stores the community token obtained in act 401 in a personal wallet, such as one that can be accessed by a wallet management too. In act 403, the facility installs a wallet management tool for managing the personal wallet in which the community token is stored, such as a browser extension wallet management tool. In some embodiments, the wallet management tool is MetaMask from ConsenSys Software Inc., described at www.metamask.io. In act 403, the facility also installs the facility extension to the wallet management tool, which adds to the wallet management tool functionality for intercepting nonce signing requests presented on webpages, such as webpages retrieved and displayed by the browser in which the wallet management tool and facility extension are installed. The facility extension also extends wallet management tool to interact with a remote facility service to procure signatures by pool NFTs. In some embodiments, the facility extension is implemented as a MetaMask Snap script, described at docs.metamask.io/guide/snaps.html, consensys.net/blog/metamask/how-metamask-flask-enables-developers-to-build-the-latest-technical-innovations-in-web3/, and medium.com/metamask/introducing-the-next-evolution-of-the-web3-wallet-4abdf801a4ee, each of which is hereby incorporated by reference in its entirety.

Figure 5:
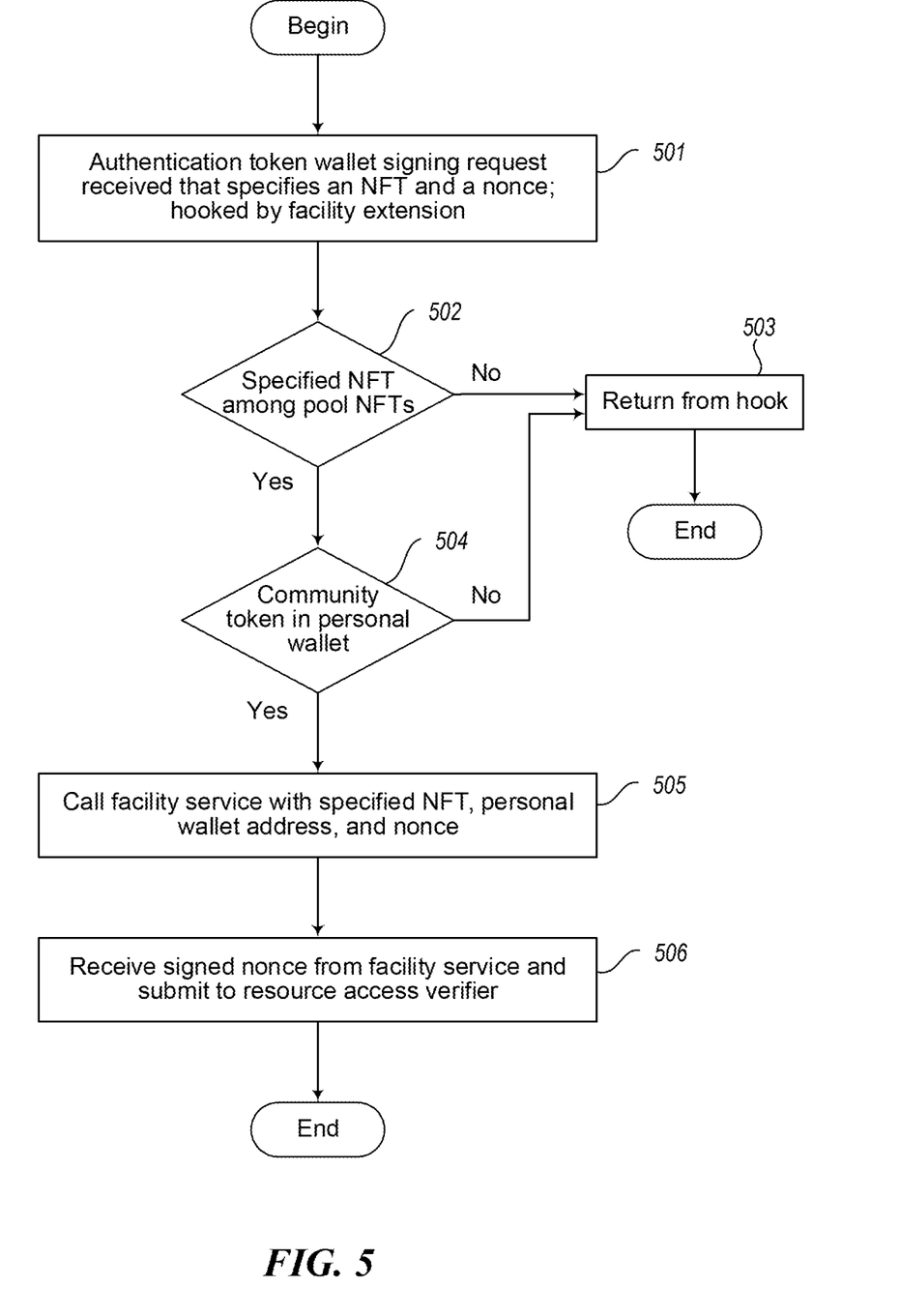
FIG. 5 is a flow diagram showing a process performed by the facility in some embodiments in order to respond to an intercepted token signing request for access to a resource.

In act 404, the facility follows a link or other URL to a resource that corresponds to a selected pool NFT. In some embodiments, the facility provides a webpage or other directory containing these links for each of the pool NFTs and the resources to which they correspond. In some embodiments, act 404 includes making a selection or following a further link in order to sign in for access to the resource using a personal wallet. In act 405, after the facility has intercepted a nonce signing request and responded to it with a signature generated by the facility using the community wallet containing the pool NFT—as shown in FIG. 5 and discussed below—the facility accesses the resource on behalf of the person, permitting the person to use the resource. After act 405, the facility can follow a link to another resource in act 404.

Those skilled in the art will appreciate that the acts shown in FIG. 4 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 5 is a flow diagram showing a process performed by the facility in some embodiments in order to respond to an intercepted nonce signing request for access to a resource. In act 501, the facility extension executes to process the request, such as by scanning page contents; hooking or registering to be notified by code of the wallet manager that handles recognition of the request, etc. In act 502, if the NFT whose wallet is to be used to sign the nonce is among the pool NFTs, then the facility continues in act 504, else the facility continues in act 503. In act 503, the facility returns from the hook and ends its processing of the request. In act 504, if the personal wallet holds a community token, then the facility continues in act 505, else the facility continues in act 503 to return from the hook. In various embodiments, act 504 involves inspecting the wallet via the wallet manager; reviewing the blockchain entries that show the current owner of the community token; etc. In act 505, the facility calls the facility service on the facility host with the identity of the specified NFT that is to sign the nonce, the nonce, and the address of the personal wallet holding the community token corresponding to the resource. The processing of this call in shown in FIG. 6 and discussed below. In act 506, the facility receives the signed nonce from the facility service and submits it to the resource access verifier on the website hosting the resource. After act 506, this process concludes.

Figure 6:
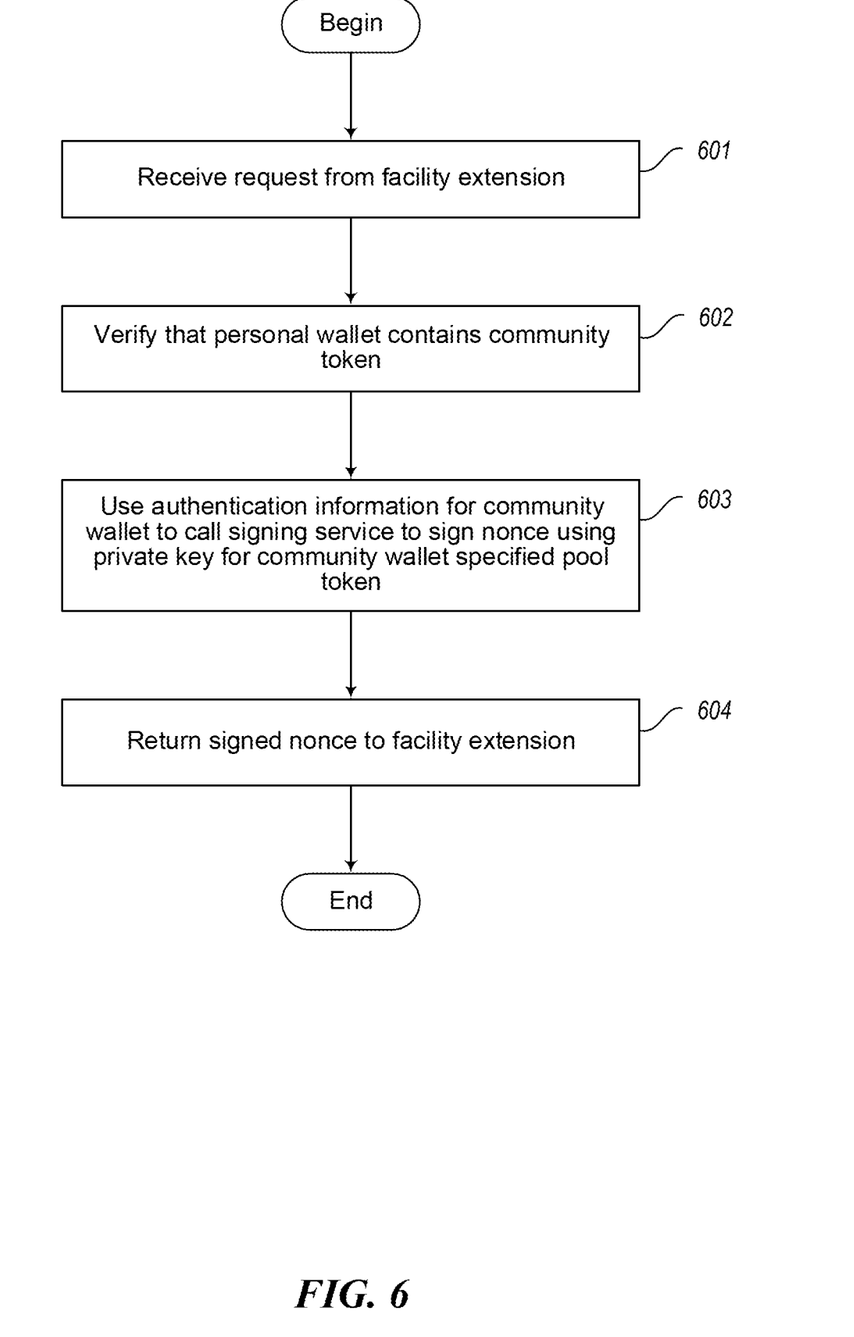
FIG. 6 is a flow diagram showing a process performed by the facility in some embodiments in the facility service to process a request from the facility extension to sign a nonce with a pool token.

FIG. 6 is a flow diagram showing a process performed by the facility in some embodiments in the facility service to process a request from the facility extension to sign a nonce with a pool token. In act 601, the facility receives the request from the facility extension, generated in act 505 shown in FIG. 5. In act 602, the facility verifies that the personal wallet contains the community token, such as by inspecting the wallet, and/or blockchain entries showing the current owner of the community token, accessing a cache populated by doing this earlier, etc. In act 603, the facility uses authentication information that it has stored for the community wallet containing the pool NFT to call a signing service to sign the nonce using a private key for the community wallet that the signing service has stored remotely and securely. In act 604, after receiving the signature from the signing service, the facility returns the signature to the facility extension for submission to the website in act 506, shown in FIG. 5. After act 604, this process concludes.

Figure 7:
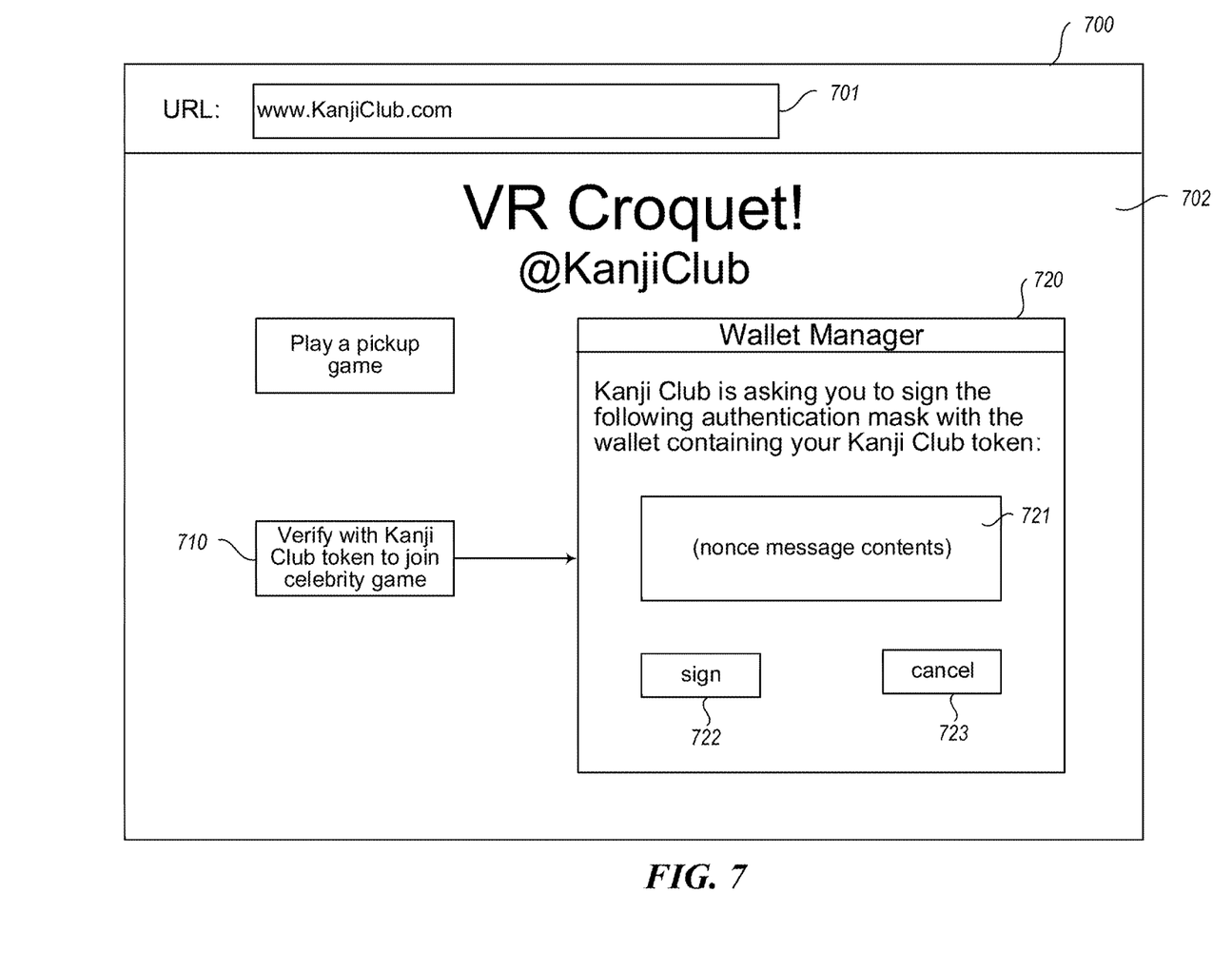
FIG. 7 is a display diagram showing a sample display presented by the facility in some embodiments when assisting a person in accessing a resource.

FIG. 7 is a display diagram showing a sample display presented by the facility in some embodiments when assisting a person in accessing a resource. The display 700, such as a webpage, contains a URL field 701 showing a URL of the webpage display. This webpage 702 is an example of a webpage published as a route to a resource whose use is limited to those people who can demonstrate possession of an NFT among a set of NFTs whose ownership connotes access to the resource. In particular, this webpage has to do with a collection of NFTs that provide access to celebrity virtual reality croquet games. The webpage includes a control 710 to access the resource by verifying possession of an NFT in the series. When the user activates this control 710, such as by clicking on it or touching it or reading its text aloud, the website displays a popup window 720 containing a request to verify possession of a Kanji Club token. The popup includes a portion 721 that contains a nonce message that is to be signed with a wallet containing a Kanji Club token in order to obtain access. When the person activates a sign control 722, the nonce message is extracted and processed as described above. Upon completion of the processing, the person is able to join a celebrity VR Croquet game.

While FIG. 7 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Figure 8:
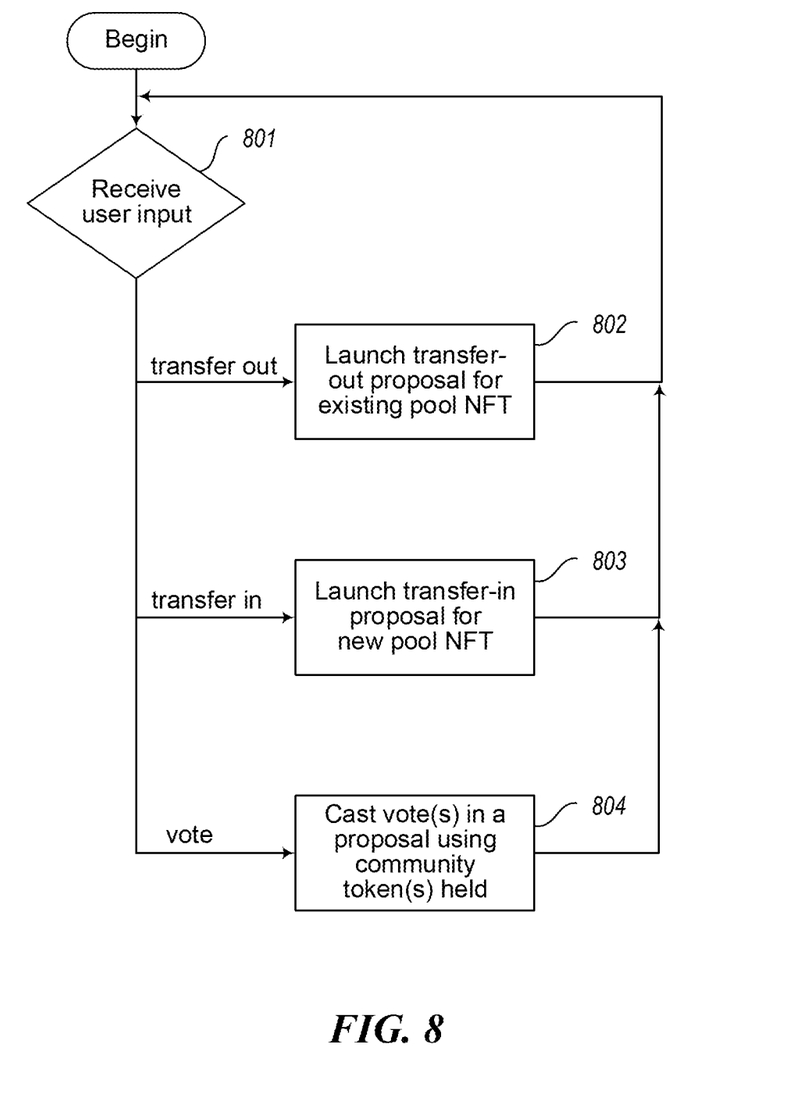
FIG. 8 is a flow diagram showing a process performed by the facility in some embodiments to permit community management of the set of NFTs contained by the NFT pool.
Figure 11:
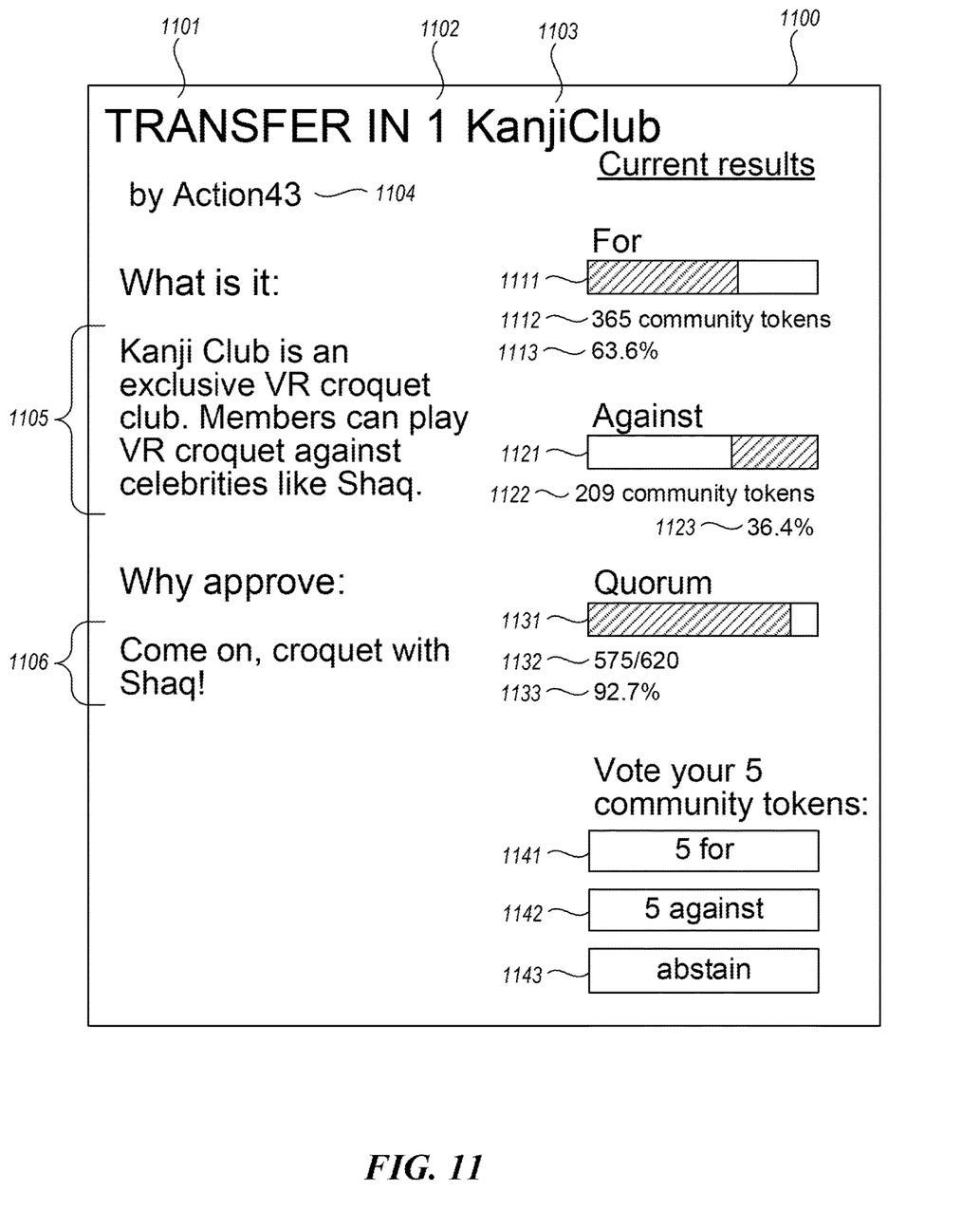
FIG. 11 is a display diagram showing a sample display presented by the facility in some embodiments to solicit votes for a particular community management proposal.

FIG. 8 is a flow diagram showing a process performed by the facility in some embodiments to permit community management of the set of NFTs contained by the NFT pool. In some embodiments, the facility uses a website or other multi-user interaction forum to interact with community members in performing community management of the pool. One page of this website is shown in FIG. 11 and discussed below.

In act 801, the facility receives user input from a community member. If the user input selects transferring an existing pool NFT out of the pool, then the facility continues in act 802; if the user input specifies transferring of a new pool NFT into the pool, then the facility continues in 803; and if the user input specifies voting on a pending proposal, then the facility continues in act 804. In act 802, the facility launches a transfer-out proposal for an existing NFT in the pool that is selected by the community member. In some embodiments, the community member can specify contents for the proposal, such as a description of the NFT to be transferred out, and a reason for transferring it out. After act 802, the facility continues in act 801 to receive additional user input. In act 803, the facility launches a proposal to transfer into the pool a new NFT selected by the community member. In some embodiments, the community member may specify additional information for the transfer-in proposal that is similar to the additional information that can be specified for the transfer-out proposal. After act 803, the facility continues in act 801. In act 804, the facility casts one or more votes in a proposal selected by the community member using one or more community tokens held by the community member; that is, the community member can cast a number of votes in each proposal that is less than or equal to the number of community tokens they hold. In various embodiments, in act 804, the facility determines or verifies the number of community tokens held by the community member, such as by examining a personal wallet controlled by the community member; examining blockchain entries establishing present ownership of certain community tokens; and/or information from the cache from performing such operations in the past. As part of casting these votes, the facility updates the status of the proposal to include the cast votes in the proposal's vote tallies. After act 804, the facility can continue in act 801.

Figure 9:
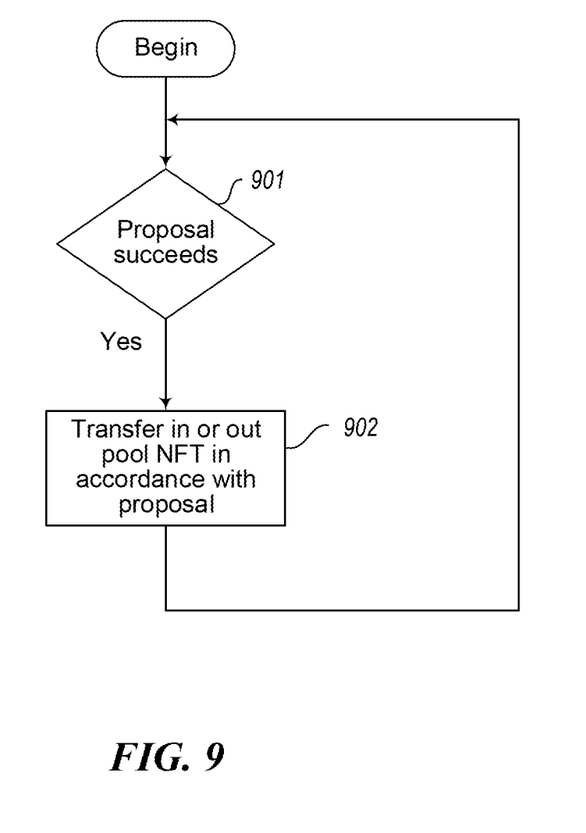
FIG. 9 is a flow diagram showing a process performed by the facility in some embodiments to complete a pool NFT acquisition or disposition proposal.

FIG. 9 is a flow diagram showing a process performed by the facility in some embodiments to complete a pool NFT transfer-out or transfer-in proposal. In act 901, if comparison of the vote tally for the proposal to proposal success thresholds—such as a majority of outstanding community tokens, or a majority of a quorum of a certain percentage of the number of outstanding community tokens—shows that the proposal succeeded, then the facility continues in act 902. In act 902 the facility transfers out or transfers in the pool NFT that was the subject of the proposal in accordance with the proposal. In some embodiments, the facility interacts with one or more NFT exchanges in order to give effect to the proposal. The facility adds a token that is obtained by the facility in this act to the community's pool. After act 902, the facility continues in act 901.

Figure 10:
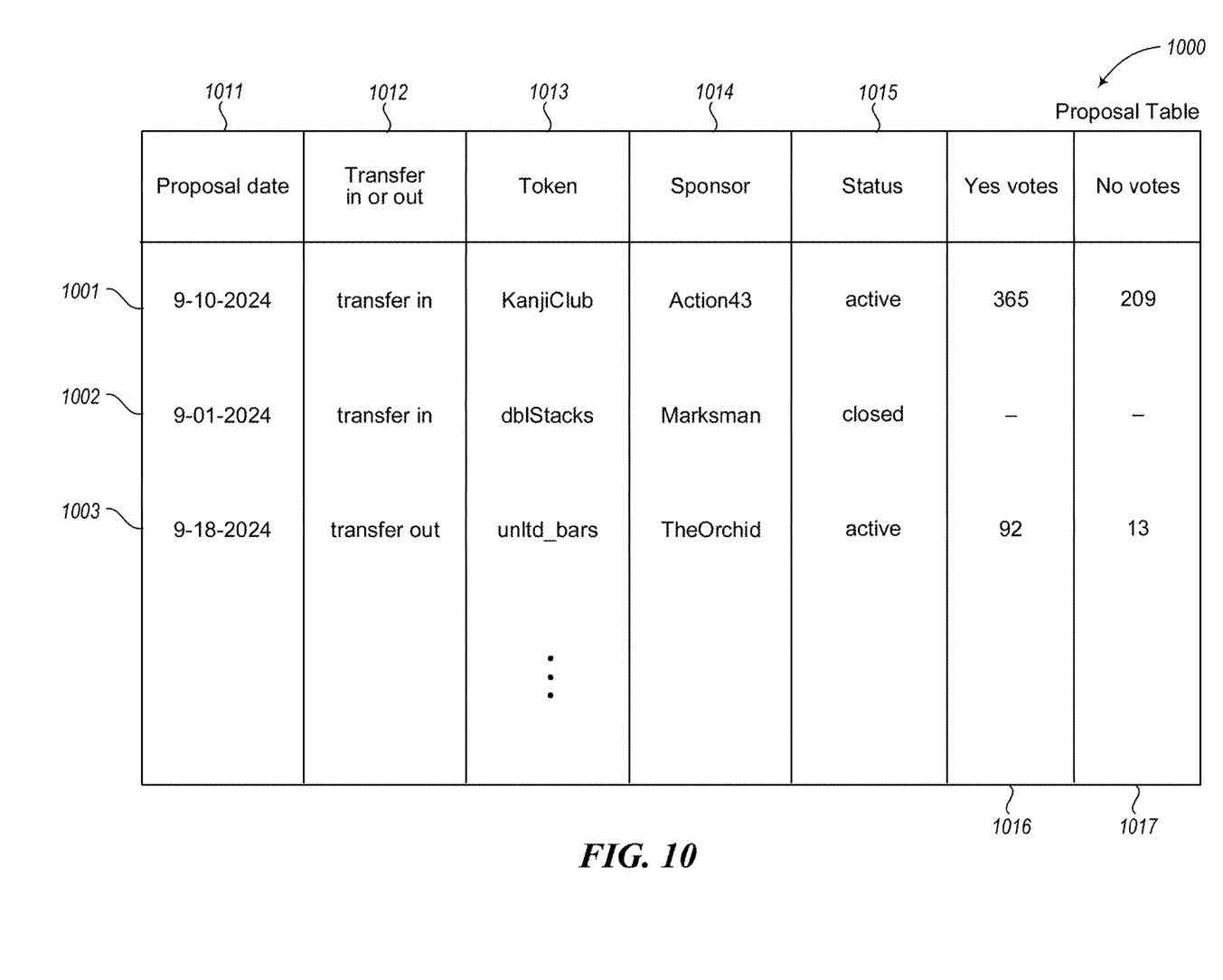
FIG. 10 is a table diagram showing sample contents of a community management proposal table used by the facility in some embodiments to maintain information about the proposals that have been launched and their status.

FIG. 10 is a table diagram showing sample contents of a community management proposal table used by the facility in some embodiments to maintain information about the proposals that have been launched and their status. The proposal table 1000 is made of rows, such as rows 1001-1003, each corresponding to a different proposal that has been launched. Each row is divided into the following columns: a proposal date column 1011 showing the date on which the proposal was launched; transfer in or transfer out a proposal type column 1012 specifying whether the proposal is to transfer in or transfer out a pool NFT; a token column 1013 containing the identity of the token that is to be transferred in or transferred out; a sponsor column 1014 specifying the community member who launched the proposal; a status column 1015 specifying a status for the proposal; a Yes votes column 1016 showing the tally of Yes votes cast thus far for the proposal; and a No votes column 1017 showing the tally of No votes thus far cast for the proposal. For example, row 1001 shows that a proposal was launched on Sep. 10, 2024 to transfer in a KanjiClub NFT. The community member Action43 launched the proposal, and is currently active. 365 Yes votes have been cast for the proposal, and 209 No votes have been cast. In some embodiments (not shown), the facility stores additional information about the proposal, such as additional information provided by the sponsor, either in proposal table 1000, or in a related data resource.

While FIG. 10 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

FIG. 11 is a display diagram showing a sample display presented by the facility in some embodiments to solicit votes for a particular community management proposal. The display 1100 includes an indication 1101 of whether the proposal is to transfer in a new NFT, or transfer out an existing NFT; an indication 1102 of the number of this NFT to be transferred in or out; an indication 1103 of the name of the name of the NFT. The display further indicates the sponsor 1104 of the proposal, as well as the sponsor's explanation of the nature 1105 of the NFT, and a reason 1106 that the proposal should be approved. The display also contains information about the current results of the proposal including a number 1112 of community tokens that have been voted in favor of the proposal, the percentage 1113 of outstanding votes that this represents, and a graph 1111 portraying this percentage. Also, the number 1122 of community tokens voted against the proposal, the percentage 1123 of the votes cast that this represents, and a graph 1121 showing this percentage. Additionally, an indication 1132 of the number of votes cast compared to a quorum threshold, a percentage 1133 of the quorum threshold that has been reached, and a graph 1131 of this percentage. The display also includes voting controls permitting the community member to take various actions with respect to voting on the proposal, including a control 1141 for voting the community member's community tokens in favor of the proposal, 1142 for voting the community member's community tokens against the proposal, and a control 1143 for abstaining from voting in the proposal.

Figure 12:
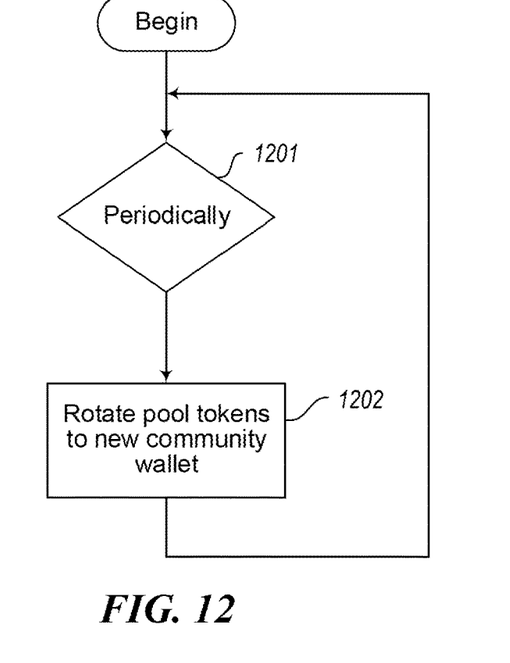
FIG. 12 is a flow diagram showing a process performed by the facility in some embodiments to circumvent blacklisting of the community wallet's wallet ID.
Figure 13:
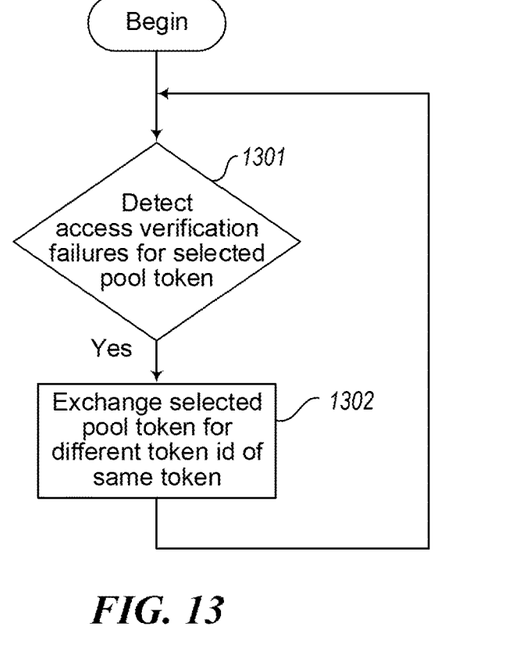
FIG. 13 is a flow diagram showing a process performed by the facility in some embodiments to circumvent blacklisting of a particular NFT in the collection of NFTs that connote access to a resource.

FIGS. 12 and 13 show techniques used by the facility in some embodiments to increase the likelihood that the community members continue to have access to the resources provided in accordance with the pool NFTs.

FIG. 12 is a flow diagram showing a process performed by the facility in some embodiments to circumvent blacklisting of the community wallet's wallet ID. In act 1201, the facility pauses for a period of time, such as a minute, an hour, a day, a week, a month, a quarter, a year, etc. In act 1202, at the end of this present pause, the facility rotates some or all of the pool NFTs from the community wallet that presently contains them to a new community wallet having a different wallet ID. After act 1202, the facility continues in act 1201.

FIG. 13 is a flow diagram showing a process performed by the facility in some embodiments to circumvent blacklisting of a particular NFT in the collection of NFTs that connote access to a resource. In act 1301, the facility detects, such as in the facility extension to the wallet manager, failures of the access verification operation for a selected pool token. In act 1302, following this detection, the facility causes the selected pool token to be exchanged for a different token having a different token ID that is in the same collection as the selected pool token. In some embodiments, act 1302 involves interacting with an exchange where one or more tokens in this token collection are available to acquire, and/or where tokens in this collection can be disposed. After act 1302, the facility continues in act 1301.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more storage device collectively having contents configured to cause a computing system to perform a method, the method comprising:
   intercepting a request directed to a distinguished user to prove ownership of a distinguished NFT;
   in response to the intercepting:
      determining that the distinguished NFT corresponds to a shared NFT among a set of shared NFTs;
      determining that the distinguished user holds a sharing NFT among a set of sharing NFTs, the set of sharing NFTs each connoting the ability to use any of the NFTs among the set of shared NFTs; and
   in response to both determining acts:
      automatically using information available by virtue of possession of the distinguished NFT to satisfy the intercepted request on behalf of the distinguished user, enabling the distinguished user to access a resource associated with the distinguished NFT.

2. The one or more storage device of claim 1 wherein ownership of the held sharing NFT by the distinguished user is verifiable using entries published on a public blockchain, such that disposal of the held sharing NFT by the distinguished user will be discernible from one or more additional entries published on the public blockchain.

3. The one or more storage device of claim 1 wherein the intercepting is performed by a wallet manager that has been adapted to proxy shared NFTs.

4. The one or more storage device of claim 1 wherein satisfying the intercepted request comprises:
   causing generation of a signature by a wallet containing the shared NFT on a message specified in the request; and
   submitting the generated signature in response to the intercepted request.

5. The one or more storage device of claim 4 wherein causing the signature's generation comprises making a call to an external key-signing service to generate the signature.

6. The one or more storage device of claim 1 further comprising:
   periodically rotating holding of the shared NFT among the plurality of wallets each having a different wallet identifier,
wherein satisfying the intercepted request on behalf of the distinguished user comprises providing the wallet identifier of the wallet holding the shared NFT at a time at which the intercepted request is satisfied.

7. The one or more storage device of claim 1 wherein the distinguished NFT has an identifier, the method further comprising:
   performing or one or more additional attempts to satisfy additional intercepted requests to prove ownership of the distinguished NFT each on behalf of a user that each fail; and
   in response to determining that the additional attempts have failed, initiating exchange of the distinguished NFT for an equivalent NFT that has an identifier different from the identifier of the distinguished NFT.

8. One or more computer memories collectively storing a data structure, the data structure comprising:
   a plurality of public blockchain entries that collectively identify, for each of a plurality of sharing tokens each connoting access to all of a plurality of resources each gated by a different one of a plurality of shared tokens, the present owner of the sharing token,
the contents of the data structure being usable to determine whether to effect access to the resource gated by a distinguished shared token by a distinguished person.

9. The one or more computer memories of claim 8, the data structure further comprising:
   for each of the plurality of shared tokens, credentials adequate to sign an arbitrary message with a wallet containing the shared token.

10. A method in a computing system, comprising:
   intercepting a request directed to a distinguished user to prove possession of a distinguished NFT;
   in response to the intercepting:
      determining that the distinguished NFT corresponds to a shared NFT, and that the distinguished user is among a group of users entitled to use the distinguished NFT; and
   in response to both determining acts:
      automatically using information available by virtue of possession of the distinguished NFT to satisfy the intercepted request on behalf of the distinguished user.

11. The method of claim 10 wherein satisfying the intercepted request enables the distinguished user to access a resource associated with the distinguished NFT.

12. The method of claim 10 wherein determining that the distinguished user is among a group of users entitled to use the distinguished NFT comprises:
   determining that the distinguished user possesses an NFT among a group of NFTs, each of the group of NFTs connoting membership in the group of users.

13. The method of claim 12 wherein determining that the distinguished user owns an NFT among a group of NFTs comprises:
- accessing a set of one or more blockchain entries establishing current ownership of a distinguished NFT among the group of NFTs; and
- analyzing the blockchain entries of the set to identify the distinguished user as the current owner of the distinguished NFT.

14. The method of claim 13 wherein the accessing occurs at a first time, the method further comprising:
- at a second time distinct from the first time:
  - intercepting a second request directed to the distinguished user to prove ownership of the distinguished NFT;
  - in response to intercepting the second request:
    - accessing a second set of one or more blockchain entries establishing current ownership of a distinguished NFT among the group of NFTs;
    - analyzing the blockchain entries of the second set to identify a second user distinct from the distinguished user as the current owner of the distinguished NFT; and
    - in response to identifying the second user as the current owner of the distinguished NFT, omitting to satisfy the intercepted second request on behalf of the distinguished user.

15. The method of claim 12 wherein determining that the distinguished user owns an NFT among a group of NFTs comprises:
- obtaining from the distinguished user the signature of a wallet containing a distinguished NFT on a distinguished message; and
- verifying the correctness of the distinguished wallet's signature on the distinguished message.

16. The method of claim 12 wherein determining that the distinguished user owns a distinguished NFT among a group of NFTs comprises:
- examining contents of a wallet that are accessible by the distinguished user to determine that the wallet contains the distinguished NFT.

17. The method of claim 10 wherein determining that the distinguished NFT corresponds to a shared NFT comprises determining that the distinguished NFT corresponds to a selected NFT among a plurality of shared NFTs.

18. The method of claim 10 wherein the intercepting is performed by a wallet manager that has been adapted to proxy shared NFTs.

19. The method of claim 10 wherein satisfying the intercepted request comprises:
- making a first call to an external key-signing service to generate a signature by a wallet containing the shared NFT on a message specified in the request; and
- submitting the generated signature in response to the intercepted request.

20. The method of claim 19, further comprising:
- before making the first call:
  - obtaining the shared NFT; and
  - making a second call to the external key-signing service providing information usable by the external key-signing service to generate a signature on any message by the wallet containing the shared NFT, the provided information being obtained in connection with acquisition of the shared NFT.

21. The method of claim 10, further comprising:
- periodically rotating holding of the shared NFT among the plurality of wallets each having a different wallet identifier,
wherein satisfying the intercepted request on behalf of the distinguished user comprises providing the wallet identifier of the wallet holding the shared NFT at a time at which the intercepted request is satisfied.

22. The method of claim 10 wherein the distinguished NFT has an identifier, the method further comprising:
- performing or one or more additional attempts to satisfy additional intercepted requests to prove possession of the distinguished NFT each on behalf of a user that each fail; and
- in response to determining that the additional attempts have failed, initiating exchange of the distinguished NFT for an equivalent NFT that has an identifier different from the identifier of the distinguished NFT.

23. The method of claim 10, further comprising:
- at a time before intercepting the request:
  - receiving from a first user among the group of users entitled to use the distinguished NFT a proposal to transfer in the distinguished NFT as a shared NFT;
  - causing the received proposal to be presented to users among the group of users;
  - receiving votes on the received proposal by users among the group of users;
  - tallying the received votes to determine that the proposal has been approved by the group of users; and
  - in response to determining that the proposal has been approved by the group of users, causing the distinguished NFT to be transferred in.

24. The method of claim 10, further comprising:
- at a after satisfying the intercepted request:
  - receiving from a first user among the group of users entitled to use the distinguished NFT a proposal to transfer out the distinguished NFT as a shared NFT;
  - causing the received proposal to be presented to users among the group of users;
  - receiving votes on the received proposal by users among the group of users;
  - tallying the received votes to determine that the proposal has been approved by the group of users; and
  - in response to determining that the proposal has been approved by the group of users, causing the distinguished NFT to be transferred out.

\* \* \* \* \*